UNITED STATES PATENT OFFICE 2,282,811

PRESERVATION OF OILS

Sidney Musher, New York, N. Y., assignor to Musher Foundation Incorporated, New York, N. Y., a corporation of New York No Drawing. Application November 25, 1940, Serial No. 367,008

9 Claims. (Cl. 260—398.5)

The present invention relates to the stabilization of glyceride oils against oxidative deterioration.

It has been found that it is possible to add to glyceride oils small proportions of gallic acid and pyrogallol or their progenitors without the addition of other materials or compounds and with effective stabilization of the glyceride oils provided the glyceride oils after combination with and thorough dispersion of small amounts of the gallic acid or pyrogallol or their progenitors therethrough are heated to temperatures substantially above 350° F.

This is quite an unusual effect inasmuch as it has been found with the glycerides themselves that they tend to lose or to become decreased in stability when heated to elevated temperatures and it has furthermore been found that a glyceride such as lard, for example, will be many times more subject to oxidative deterioration when heated to a very high temperature than when it is held at a low temperature.

According to the preferred procedure, from 0.001% to 2% and preferably between 0.01% and 0.75% of the gallic acid or pyrogallol or their progenitors are thoroughly dispersed in the lard, for example, following which the lard containing the added material thoroughly dispersed throughout the body thereof is heated to an elevated temperature in excess of 350° F. and preferably to between about 400° F. and 450° F. for a relatively short period of time.

The resultant lard obtained after cooling is from 3 to 10 times as stable as the lard containing the pyrogallol or gallic acid which has not been heated to the elevated temperature and is from 10 to 50 times as stable as the lard which does not contain the gallic acid or pyrogallol.

Among the glyceride oils and fats which may be processed in accordance with the present invention are included the vegetable or animal glyceride oils and fats, whether crude, refined or hydrogenated and including also the industrial glyceride oils. Among such oils are cottonseed oil, corn oil, soya bean oil, sesame oil, peanut oil, tea seed oil, palm oil, palm kernel oil, cocoanut oil, tallow, lard, oleo oil and including also the fish and fish liver oils such as menhaden oil, herring oil, mackerel oil, cod liver oil, halibut liver oil, etc.

This process has been found to be particularly of value in the treatment of those glyceride oils which are substantially unsaturated in character or which contain a large proportion of unsaturated glycerides.

Following treatment in accordance with the present invention, the glycerides may be refined or may be used in the manufacture of soaps or for sulfonation.

Example

The following tests were conducted using lard as the glyceride, the tests having been conducted by bubbling air through a 20 cc. sample of the lard at 208° F. until rancidity is determined both by peroxide value and organoleptically.

| | Rancid after— |
|---|---|
| Untreated lard | 2 hours |
| Lard containing 0.005% tannic acid | 6 hours |
| Lard containing 0.005% tannic acid heated in the lard to 400° F. for 5 minutes, allowed to cool and then tested as above | 35 hours |
| Lard containing 0.005% pyrogallol | 36 hours |
| Lard containing 0.005% pyrogallol heated in the lard to 400° F. for 5 minutes, allowed to cool and then tested as above | 114 hours |

Where the added material is dispersed in a small amount of the glyceride, heated to the elevated temperature and then combined with additional glyceride, the desirable results of the present invention are not obtained and it is important that the entire body of the glyceride be treated with the added material.

Moreover, it has not been found possible merely to heat the added material itself and then add such heated material to the oil to obtain the enhanced stabilization. In order to obtain the interaction, it is necessary for the heating to be conducted after dispersal of the added material in the oil.

Apparently a chemical reaction occurs between the added material such as the gallic acid or pyrogallol and the glyceride at the elevated temperature whereby the stabilization is effected, as this reaction does not appear to be related to ordinary negative oxidation catalysis by means of which antioxidants normally exercise activity.

The higher the temperature to which the oil containing the gallic acid or pyrogallol is subjected, the greater the stabilizing action, although the sharpest increase in stabilization is between about 350° F. and 450° F.

The heat treatment need not be prolonged, the enhanced antioxygenic effect being obtained in relatively short periods particularly where the higher temperatures are employed. Normally the oil containing the gallic acid or pyrogallol may merely be heated to the desired temperature and allowed to cool, being held at the high temperature for a period of about 10 minutes or more.

The heat treatment will usually be carried out at atmospheric pressure but the use of super or sub atmospheric pressures may also be employed with satisfactory results.

Not only are the glycerides themselves stabilized in accordance with the present invention, but components of the oils are also stabilized. For example, the vitamin A content of fish liver and other oils, the carotene content of butterfat and similar substances associated with the oils which may be destroyed or reduced by oxidation are highly stabilized by this treatment.

It has been found particularly desirable for a small amount of the pyrogallol or gallic acid or progenitors to be added to high fat containing animal products, heating at atmospheric or elevated pressures to temperatures of about 250° F. so that the glyceride oil or fat contained there is released from the meat or fish animal product and a highly stabilized animal glyceride is obtained.

For example, to a kettle of hog fat containing 70% total glycerides may be added 0.02% of pyrogallol or gallic acid or progenitors against the weight of the hog fat and the combination placed in a steam kettle with steam being injected into the kettle to produce about 45 pounds pressure. After a 4 to 6 hour treatment, the pressure may be released and the rendered lard removed. The stability of the lard obtained in this manner will be much greater than if the added material had merely been added to the lard after rendering.

For example, when a small amount of pyrogallol or gallic acid or their progenitors is added to hot fat and the hog fat containing the added material is then rendered at a temperature of 275° F. or more for 4 hours, the rendered lard removed from the rendering kettle has a far greater stability than where a proportionate amount of the added material is added to the lard after rendering and the improvement in stability is even greater than where the added material is added to the lard after rendering and the lard containing the added material is then heated to 275° F. or more for 4 hours. Apparently a further interaction takes place by adding the added material to the rendering kettle where the rendering is conducted at over 250° F. resulting in a most highly stabilized oil.

In a similar manner, a small amount of the pyrogallol or gallic acid or their progenitors may be added to the rendering kettle in the rendering of other meat and fish oils and fats including tallow, menhaden oil, herring oil, etc., or to the cooking kettles in the manufacture of fish meals, particularly high glyceride containing fish meals, and where the temperature is at least about 250° F., the desired interaction will result producing enhanced stabilization.

Where the glyceride oils are heated over long period to temperatures over 250° F. and desirably to temperatures over 300° F., small amounts of pyrogallol or gallic acid or their progenitors may be added to the oils at regular intervals of 5 to 20 hours to assure continued stabilization. In this manner, the glycerides will be held in highly stabilized and non-rancid condition over very long periods.

In addition to or in lieu of gallic acid or pyrogallol it is possible to use tannic acid, gallotannin, di-gallic acid, ellagic acid or glucosides. Materials containing substantial quantities of these tannins and glucosides may similarly be employed and will result in enhanced stabilization after being thoroughly dispersed through and heated in the entire body of the glyceride oil subject to oxidation.

It is also possible to utilize other tri-hydroxy-benzenes such as, for example, phloroglucinol or 1, 2, 4 tri-hydroxy-benzene. It is also possible to utilize materials which will decompose or split forming these tri-hydroxy-benzenes under conditions of the elevated temperature treatment so that they may be added to the glyceride oil and will result in the formation of the tri-hydroxy-benzene as a result of the elevated temperature treatment.

Less preferably, it is possible to utilize other tri-hydroxy-aryl compounds in which the benzene ring is replaced by another aromatic nucleus such as naphthalene or anthracene.

It is also possible to use substituted tri-hydroxy-aryl compounds in which one or more of the hydrogens of the hydroxy groups or the nucleus have been replaced by other groups such as the alkyl groups as, for example, methyl, ethyl, butyl, propyl, etc., or aryl groups such as benzyl, phenyl, tolyl, or xylyl, or even amino or alkyl amino groups.

In addition to treating the glyceride oils and fats with these combinations, the essential oils and particularly the oxidizable unsaturated essential and perfume oil such as lemon oil and orange oil may similarly be treated followed by the elevated temperature treatment to enhance the antioxygenic effect.

The gallic acid, pyrogallol or progenitors thereof will also exert an enhanced antioxygenic effect when added in small proportions to the substantially non-volatile, high molecular weight, hydrocarbon oils and particularly the lubricating oils followed by temperature treatments of over 250° F. and preferably between 350° F. and 500° F.

In carrying out the above described high temperature treatment, it is important that the pyrogallol or gallic acid be uniformly dispersed or distributed throughout the body of the oil in substantially fine particles and that the heating be carried out with substantial exclusion of the atmosphere or without contact with air.

It has also been found that desirable results are obtained where the pyrogallol or gallic acid is mixed with the oil or fibrous materials containing the glyceride oil and then the oil is heated to a temperature of, say from 250° F. to 500° F. under a reduced pressure, such as under a gas pressure less than 1 pound per square inch, to cause distillation of part or all of the glyceride oil composition and it has been observed that such distilled fraction is highly stable and is also free of the pyrogallol or gallic acid which has served as the stabilizing agent at the elevated temperature of distillation.

After treatment of the glyceride oil with the pyrogallol or gallic acid at the elevated temperature, the unsaponifiable fraction may be removed as by alcoholic extraction and said unsaponifiable fraction utilized for addition to other oxidizable oils to protect them against oxidative deterioration.

Less preferably, it has also been found that this same effect is obtained by the addition of the gallic acid, pyrogallol or progenitors thereof to other oxidizable oil compositions such as to the hydrocarbon oils including lubricating oils and mineral oil compositions followed by thoroughly admixing these added materials in those oils and subjecting the entire body thereof to an elevated temperature substantially in excess of 350° F. and preferably to between about 400° F. and 450° F.

Together with the pyrogallol, gallic acid, tannic acid, gallotannin or glucoside there may be utilized a complementary portion of a phosphatide, such as lecithin. For example, equal parts of lecithin and pyrogallol or gallic acid or their progenitors may be added to glyceride oils or less preferably lubricating oils and will show marked stabilizing, antioxygenic and anti-corrosive effects, particularly when subjected to elevated temperatures of 250° F. or more.

The trihydroxy aryl compounds referred to herein include the substituted and unsubstituted trihydroxy aryl compounds.

Having described by invention, what I claim is:

1. A process of stabilizing oils subject to oxidative deterioration whereby they become less subject to such deterioration, which comprises adding thereto and dispersing therein a small amount of a trihydroxy aryl compound and heating to in excess of 250° F.

2. A process of stabilizing oils subject to oxidative deterioration whereby they become less subject to such deterioration, which comprises adding thereto and dispersing therein a small amount of a trihydroxy benzene and heating to in excess of 350° F.

3. A process of stabilizing glyceride oils subject to oxidative deterioration whereby they become less subject to such deterioration, which comprises adding thereto and dispersing therein a small amount of a trihydroxy aryl compound and heating to in excess of 250° F. while the oil is under subatmospheric pressure.

4. A process of stabilizing glyceride oils subject to oxidative deterioration whereby they become less subject to such deterioration, which comprises adding thereto and dispersing therein a small amount of pyrogallol and heating to in excess of 250° F.

5. A process of stabilizing glyceride oils subject to oxidative deterioration whereby they become less subject to such deterioration, which comprises adding thereto and dispersing therein a small amount of tannic acid and heating to in excess of 250° F.

6. A process of stabilizing glyceride oils subject to oxidative deterioration whereby they become less subject to such deterioration, which comprises adding thereto and dispersing therein a small amount of gallic acid and heating to in excess of 250° F.

7. An oil normally subject to oxidative deterioration carrying the reaction product of a trihydroxy aryl compound in the oil, said reaction product having been formed by heating the trihydroxy aryl compound in the oil to a temperature in excess of 250° F. whereby an enhanced antioxygenic effect is obtained.

8. A glyceride oil normally subject to oxidative deterioration carrying the reaction product of a trihydroxy benzene in the oil, said reaction product having been formed by heating the trihydroxy benzene in the oil to a temperature in excess of 250° F. whereby an enhanced antioxygenic effect is obtained.

9. A process of stabilizing glyceride oils subject to oxidative deterioration whereby they become less subject to such deterioration, which comprises adding thereto and dispersing therein a small amount of a trihydroxy aryl compound, heating to in excess of 250° F., and then removing the unsaponifiable fraction therefrom.

SIDNEY MUSHER.